United States Patent [19]
Vauchel

[11] Patent Number: 6,151,886
[45] Date of Patent: Nov. 28, 2000

[54] TURBO JET-ENGINE THRUST REVERSER WITH SCOOP DOORS LINKED TO A DISPLACEABLE EXTERNAL COWLING PANEL

[75] Inventor: Guy Bernard Vauchel, Le Havre, France

[73] Assignee: Hispano Suiza Aerostructures, Gonfreville l'Orcher, France

[21] Appl. No.: 09/283,295

[22] Filed: Apr. 1, 1999

[30] Foreign Application Priority Data

Apr. 2, 1998 [FR] France ................................. 98 04091

[51] Int. Cl.[7] ...................................................... F02K 3/02
[52] U.S. Cl. ............................................................ 60/226.2
[58] Field of Search ................................ 60/226.1, 226.2, 60/230; 239/265.29, 265.37, 265.33

[56] References Cited

U.S. PATENT DOCUMENTS

| | | |
|---|---|---|
| 3,475,913 | 11/1969 | Mortlock et al. . |
| 5,983,625 | 11/1999 | Gonidec et al. ................. 60/226.2 |
| 6,000,216 | 12/1999 | Vauchel ................................. 60/226.2 |
| 6,082,096 | 4/2000 | Vauchel ................................. 60/226.2 |

FOREIGN PATENT DOCUMENTS

| | | |
|---|---|---|
| 97-06941 | 6/1997 | France . |
| 0 822 327 | 2/1998 | France . |

*Primary Examiner*—Timothy S. Thorpe
*Assistant Examiner*—W. Rodriguez
*Attorney, Agent, or Firm*—Bacon & Thomas, PLLC

[57] ABSTRACT

A turbojet-engine thrust-reverser comprising pivoting hollow doors (3) which in the forward-thrust mode are integrated into the external cowling of the turbojet-engine and which in the thrust-reversal mode constitute scoop-type flow-deflecting baffles. A displaceable external cowling panel (20) covers both the fore frame (8) of the stationary structure and the cross-section of the flow exhaust of the door (3) when in the forward-thrust mode. The external cowling panel (20) is pivotable on a panel pivot (24) situated downstream of the pivot (9) of the door (3) and its upstream edge moves radially outward to simultaneously clear a space above the fore frame (8) and the exhaust cross-section for the deflected flow.

8 Claims, 6 Drawing Sheets

TURBO JET-ENGINE THRUST REVERSER WITH SCOOP DOORS LINKED TO A DISPLACEABLE EXTERNAL COWLING PANEL

BACKGROUND OF THE INVENTION

1. Field of the Invention

The present invention relates to a thrust reverser of a bypass turbojet-engine. More particularly, it relates to a thrust reverser comprising scoop doors and a displaceable cowling panel.

2. Description of the Related Art

A bypass turbojet-engine is fitted with a conduit at the rear of the fan to channel the so-called cold, bypass flow. The conduit consists of an inner wall enclosing the structure of the actual engine and an outer wall with an upstream portion that is contiguous with the engine casing enclosing the fan. This outer wall is able to simultaneously channel the bypass flow and the primary flow in its downstream portion, namely rearward of the exhaust of the so-called hot, primary flow as regards mixed- or confluent-flow. However, in other cases the outer wall only channels the bypass flow, namely as regards separate flow.

Furthermore, a wall may fair the outside of the casing enclosing the fan and the outside of the above described conduit for the purpose of minimizing the powerplant drag. This is especially the case with powerplants projecting from the aircraft outside, in particular when these powerplants are affixed under the wings or to the rear of the fuselage.

European patent document 0,822,327 describes an illustrative embodiment, shown in FIG. 1 of the attached drawings, of a scoop-door thrustreverser of a bypass turbojet-engine.

The thrust reverser has a movable assembly and a stationary structure. The movable assembly is composed of hollow doors 3 constituting a movable portion 2 which in the forward-thrust mode form part of the external cowling. The stationary structure is composed of an upstream portion 6 upstream of the doors, a downstream portion 7 downstream of the doors 3, and beams linking the upstream portion 6 to the downstream portion 7. The stationary structure is also part of the external cowling.

The doors 3 are mounted along a circumference of the external cowling and are pivotable, in a downstream zone of their side walls, on the beams situated on each side of the doors connecting the downstream portion 7 to the upstream portion 6. The side walls link the outer structures 4 of the doors 3, which constitute part of the external cowling in the forward-thrust mode, to the inner parts 5 of the doors 3, which constitute part of the outer conduit wall.

The stationary structure's upstream portion 6 comprises a fore frame 8 which may act as a support for the displacement control system of the doors 3, for example, linear actuators. This displacement control system for the doors 3 may just as well be situated elsewhere on the periphery of the door 3, for instance downstream of it. In such a case, it will be the stationary structure's downstream portion 7 that supports the control system.

When driven into an open position, the doors 3 pivot in such a manner that the part of the door upstream of the door pivot 9 more or less obstructs the duct totally while the external structure 4 clears a passage in the external cowling to allow channeling of the bypass flow 13 and 14 radially outward relative to the longitudinal axis of the conduit: on one hand through an inner conduit 10 formed by the structure of the door 3 and on the other hand between the deflecting edge and the outside of the outer structure 4 of the door 3. The downstream part of the doors is moved into the vicinity of the outside of the external cowling. The pivoted angle is adjusted to strongly reduce, even suppress, the thrust by the bypass flow and to generate a counter-thrust by delivering an upstream-deflected flow component.

Because the door dimensions are constrained by the aerodynamic dimensions of the flow passage cleared by the outer structure 4 and by the door positioning in the thrust-reversal mode, the stationary structure has a projecting shape 12 at the outer downstream side of the fore frame 8. A more or less pronounced stagnant fluid zone 11 is typically present in all conventional door designs in this vicinity which reduces the forward airflow during thrust reversal. This stagnant zone 11 thus forms an aerodynamic plug reducing the effective cross-section of the reversal.

French patent application 2,764,339 proposes a movable fairing design, which covers the fore frame in the forward-thrust mode and rotationally retracts about a pivot linked to the stationary structure to clear a space, and an aerodynamic configuration downstream of the fore frame, which improves aerodynamic performance during thrust-reversal.

The length of the cross-section of the door exhaust 15 of the above described thrust reverser is mainly a function of door opening angle. In the forward thrust mode, the upstream edge of the stationary fairing 16 must not interfere with the flow 13 moving toward the outside through the conduit 10 of the door 3. This parameter determines the extreme upstream position the edge may assume. In the forward-thrust position, the upstream edge of the stationary fairing 16 interfaces with the downstream edge of the outer structure 4 of the door 3. Therefore, the cross-section in this design will be fixed.

French and European patent applications 2,764,339 and 0,822,327 involve solutions to increasing the length of the door exhaust's cross-sectional length by combining hinge means independent of the stationary structure.

In some thrust-reverser configurations, optimal aerodynamic performance may require simultaneously clearing the downstream frame portion and increasing the door's outlet cross-section. In such a case the techniques might be combined. If so, however, a large number of movable parts will be needed, entailing cost and weight increases and moreover at the risk of mutual interference.

Simultaneously using several techniques may substantially reduce the overall thrust-reverser reliability.

SUMMARY OF THE INVENTION

One of the objectives of the present invention is to increase the aerodynamic performance of the scoop doors, in particular during the thrustreversal mode of the thrust reverser, without incurring the drawbacks of the known, prior solutions and while containing cost, weight and risk of unreliability.

These goals are implemented in the invention by a turbojet-engine scoop-door thrust reverser of the above species which has a displaceable external cowling panel, comprising a downstream portion and an upstream portion connected to each other by two sides so as to form a central cowling aperture which corresponds to the opening for the outer structure of the door. In the forward-thrust mode, the cowling panel covers both the fore frame and the flow exhaust cross-section of the door. The cowling panel is pivotable about a panel pivot mounted downstream of the door pivot. The upstream edge of the external cowling panel is moved radially outward relative to the axis of the conduit during the thrust-reversal mode such that a space is cleared above the fore frame and the exhaust cross-section for the deflected flow with part of the reversed flow passing through the central cowling aperture.

BRIEF DESCRIPTION OF THE DRAWINGS

Other features and advantages of the invention are elucidated in the following description of illustrative embodiments of the invention, with reference to the attached drawings, in which.

DETAILED DESCRIPTION OF THE PREFERRED EMBODIMENTS

Figure 1:
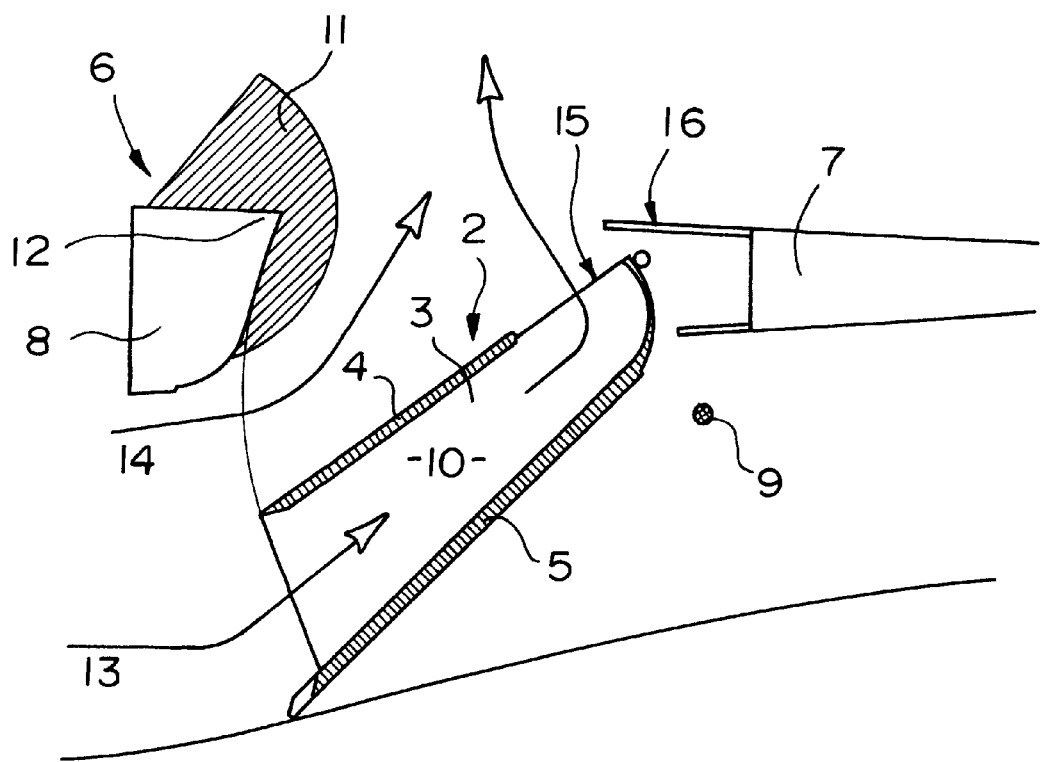
FIG. 1 is a half schematic view, via a longitudinal section in a plane passing through the axis of rotation of an associated turbojet engine, of a known pivotable scoop-door thrust reverser, the door being shown in the open position.
Figure 2:
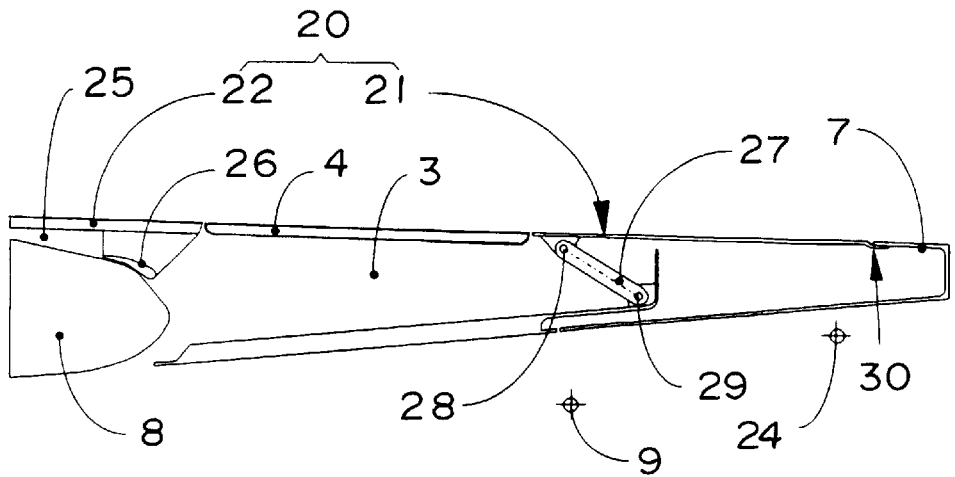
FIG. 2 is a view similar to that of FIG. 1 of a scoop-door thrust reverser according to an illustrative embodiment of the invention, but with the door in the closed position.
Figure 3:
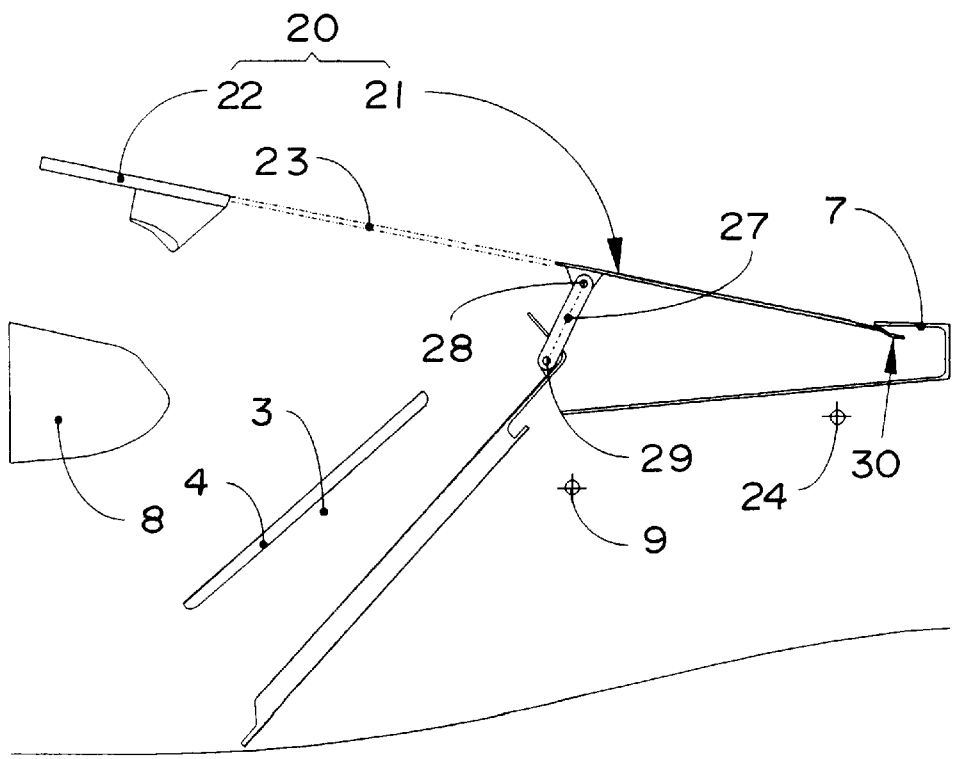
FIG. 3 is a view of the embodiment of FIG. 2 in the thrust-reversal mode.

In one illustrative embodiment of the invention shown in FIGS. 2 and 3, a scoop door 3 hinges about a door pivot 9 on the stationary structure. The embodiment includes a displaceable cowling panel 20 comprising a downstream portion 21 and an upstream portion 22 which are connected by at least two sides 23 so as to form a central aperture in the cowling panel 20, which corresponds to the opening for the outer structure 4. The displaceable cowling panel 20 hinges downstream of the door 3 about a panel pivot 24 which is part of the stationary structure. The upstream portion 22 of the cowling panel 20, when in the forward-thrust mode, covers all or part of the structure of the fore frame 8, thereby creating a space 25 of a size selected to ultimately and optionally house aerodynamic components to be defined by the expert, for instance a vane 26 as shown in the illustrative Figures. The inner shape of the upstream portion 22 may be specifically designed to optimize and guide the flow in the thrust-reversal mode.

In the thrust-reversal mode, the door 3 moves about door pivot 9. Preferably, the motion of the cowling panel 20 is linked to that of the door 3 such that the cowling panel 20 simultaneously pivots about panel pivot 24 in a direction opposite to the rotation of the door 3. During this motion, the upstream portion 22 clears the upper zone of the fore frame 8, i.e. a passage with an aerodynamic contour matching the frame, thereby improving effectiveness of the reversed flow. Part of the reversed flow passes through the central aperture of the cowling panel 20. The illustrative linkage between the two movable components is in the form of at least one linkrod 27 rigidly joined at a first linkrod pivot point 20 to the door 3 and at a second linkrod pivot point 28 to the inner structure of the downstream portion 21. The linkrod system shown at the center of the door 3, of course, may be situated at any other place symmetrical to the door's center plane as far outside and downstream of the door structure as desired.

In the embodiment of the Figures, the door 3 is the motion controller because, when in the thrust-reversal mode, the alignment of the three pivot points 9, 28 and 29 is bypassed, thereby precluding the door 3 from moving via motion of the cowling panel 20. Obviously, if the drive kinematics specified by the expert is a kinematics of three unaligned but bypassed pivot points, that is if the first linkrod pivot point 29 is downstream of a straight line joining the door pivot 9 and the second linkrod pivot point 28, the motion controller may be the cowling panel 20.

When in its outwardly extended position, the cowling panel 20 advantageously allows access to the displacement control system typically situated within the zone of the fore frame 8 without having to open the cowling enclosing the engine's fan casing upstream of the thrust reverser. The thrustreverser's structures thus reduce aircraft maintenance costs.

The downstream part 30 of the downstream portion 21 may be designed to interface with the stationary downstream structure 7.

Figure 4:
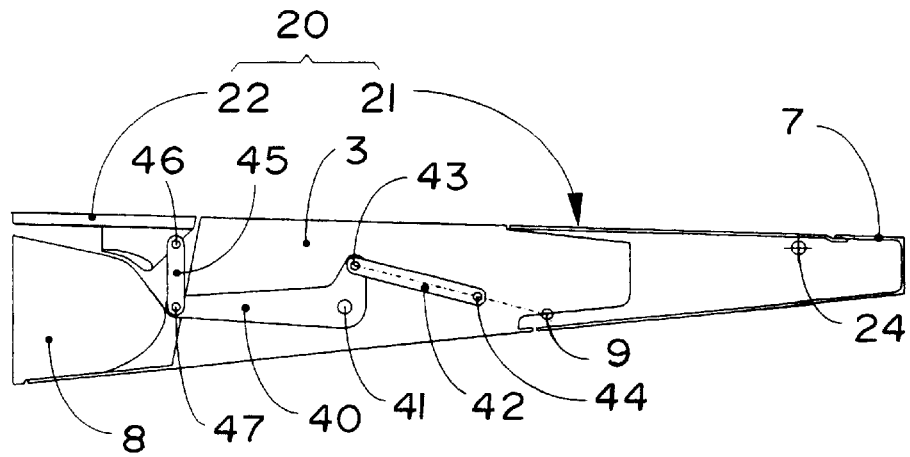
FIG. 4 is a view of a scoop-door thrust reverser according to another illustrative embodiment of the invention in the forward-thrust mode.
Figure 5:
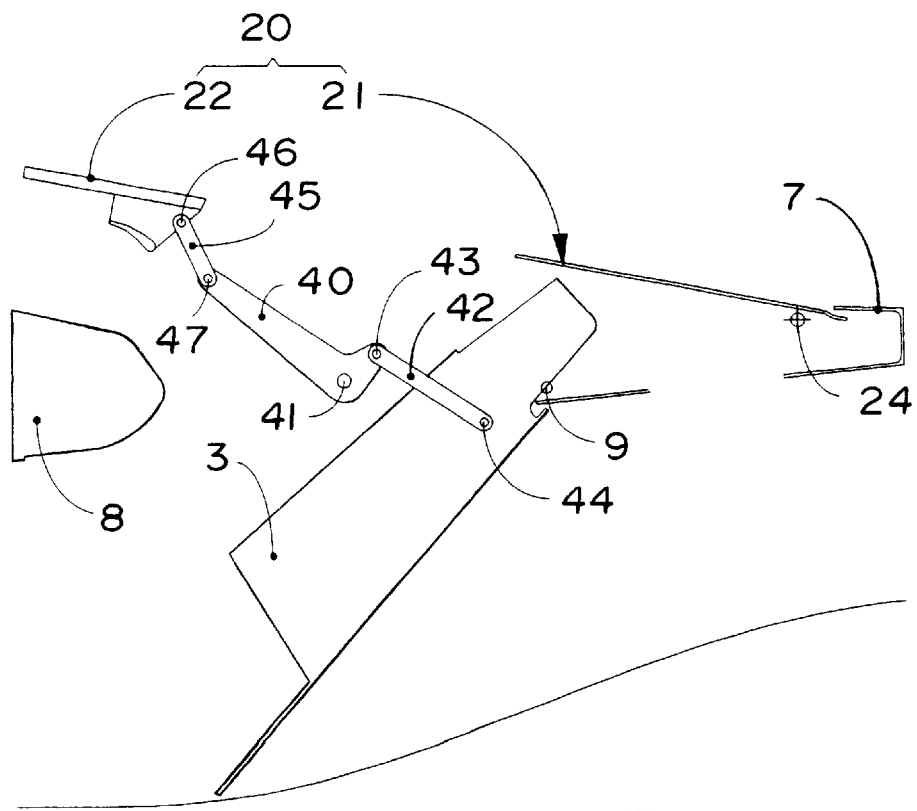
FIG. 5 is a view of the embodiment of FIG. 4 in the thrust-reversal mode.

FIGS. 4 and 5 show an illustrative embodiment of a lateral drive system situated upstream of the door pivot 9. A lever arm 40 hinging at a lever arm pivot point 41 on the stationary structure is driven by the door 3 through a downstream linkrod 42 affixed to the door 3 at a first downstream pivot point 44 and affixed to the lever arm 40 at a second downstream pivot point 43. An upstream linkrod 45 affixed at a first upstream pivot point 47 to the lever arm 40 is connected at a second upstream pivot point 46 to the upstream portion 22.

Aligning the downstream pivots 43 and 44 of the downstream linkrod 42 with the door pivot 9 does not result in additional opening torque being applied to the door 3 and thus assures complete neutrality of the displaceable cowling panel 20 relative to the door 3 to avoid accidentally driving the door 3 by the displaceable cowling panel 20.

Figure 6:
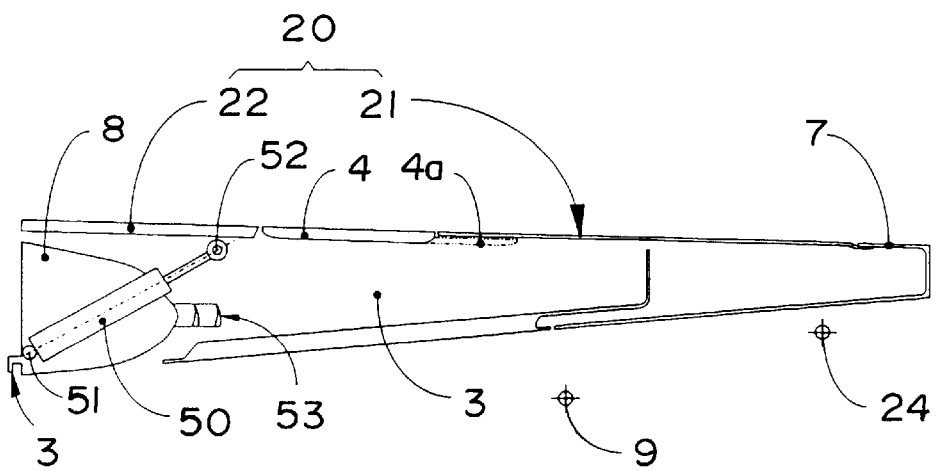
FIG. 6 is a view of another embodiment in the forward-thrust mode.
Figure 7:
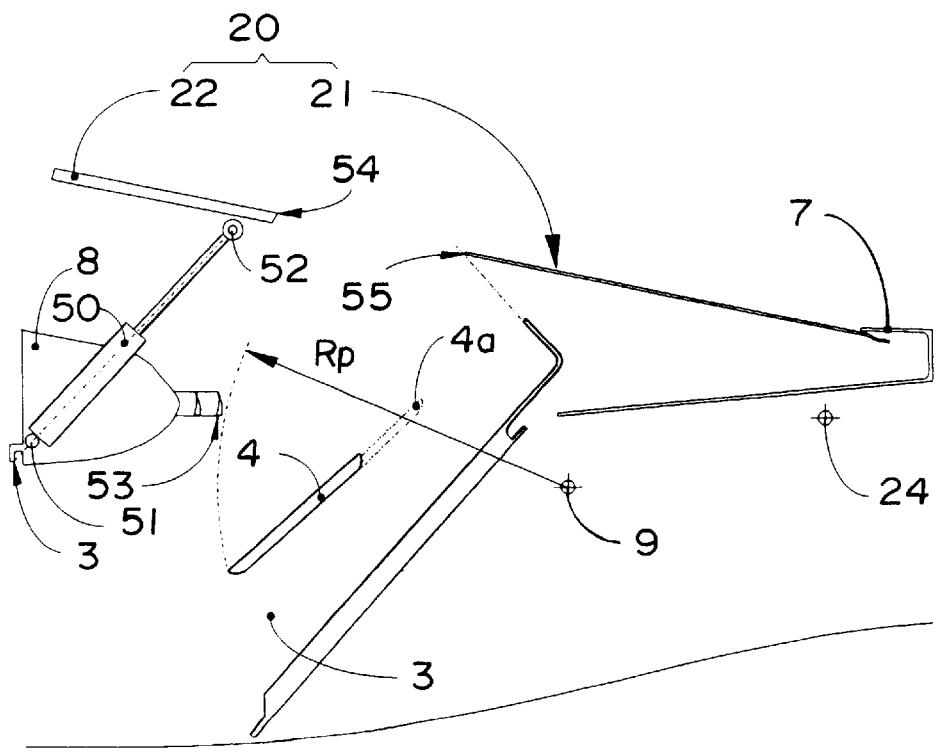
FIG. 7 is a view of the embodiment of FIG. 6 in the thrust-reversal mode.

FIGS. 6 and 7 show an illustrative embodiment of a displacement control system acting on the displaceable cowling panel 20. The door 3 may either be fitted with its own independent drive member as defined in the European patent document 0,822,327 or it may be controlled by the displaceable cowling panel 20 as elucidated above. At least one linear actuator 50 hinging on the stationary structure, for example, the fore frame 8, at a first actuator pivot point 51 is linked at a second actuator pivot point 52 to the upstream portion 22. In the thrust-reversal mode, the axis of the linear actuator passes through the stationary structure's junction interface 8a with the turbojet-engine casing to reduce, even cancel, the impact from the torque generated on interface 8a by the flow on the cowling panel 20. It is understood that the displaceable cowling panel 20 can be driven by at least one linear actuator 50 situated downstream of the door 3 and affixed to the stationary structure or on part of the stationary side structures on each side of the door, commonly called beams.

Regardless of the displacement control system shown in these Figures for the displaceable cowling panel 20, the following further feasible configurations of the thrust-reverser structures are shown in FIGS. 6 and 7.

Advantageously, an upstream part 55 of the downstream portion 21 may extend upstream until meeting the geometry of the flow exhausted from the door 3. The upstream part 55 may be nonlinear and/or—in the forward-thrust mode—may cover a part 4a of the outer structure 4 of the door 3 for the purpose of steering the flow-exhaust cross-section in another manner. Because the part 4a is masked in the forward-thrust mode, it may comprise apertures or gills.

Advantageously, a downstream part 54 of the upstream portion 22 may extend downstream to reduce the distance Rp from the door pivot 9 to the upstream side of the outer structure 4. Thus, the radius Rp may be defined in such a way that at least one row of vanes 53 can be mounted on the fore frame 8. Like the upstream part 55 of the downstream portion 21, the downstream part 54 of the upstream portion 22 may cover—in the forward thrust mode—part of the outer structure 4 of the door 3.

Figure 8:
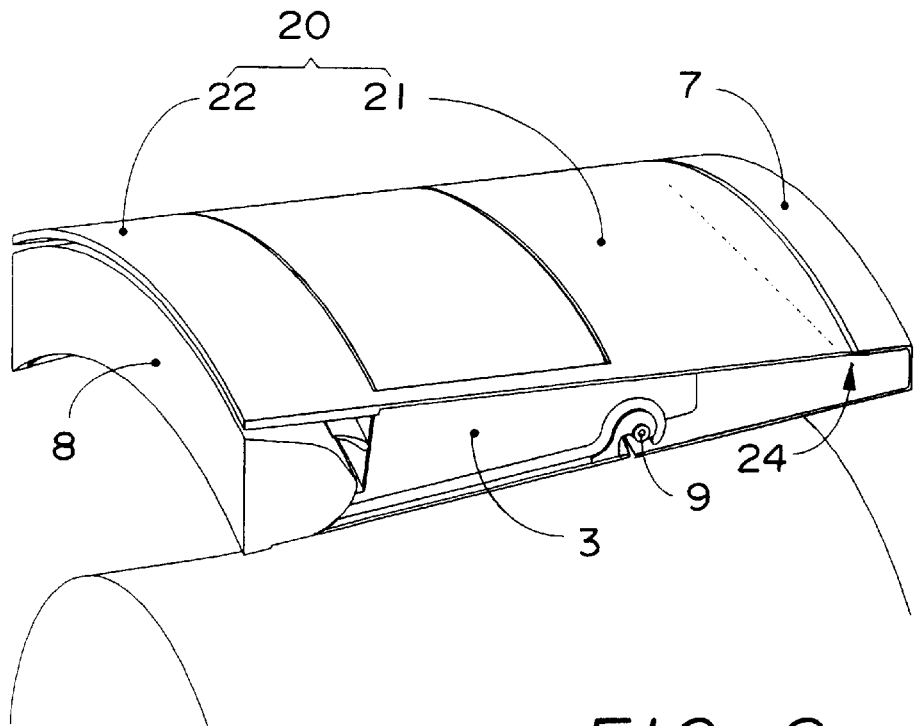
FIGS. 8, 9 are perspective views of the embodiment of FIGS. 2 and 3.
Figure 9:
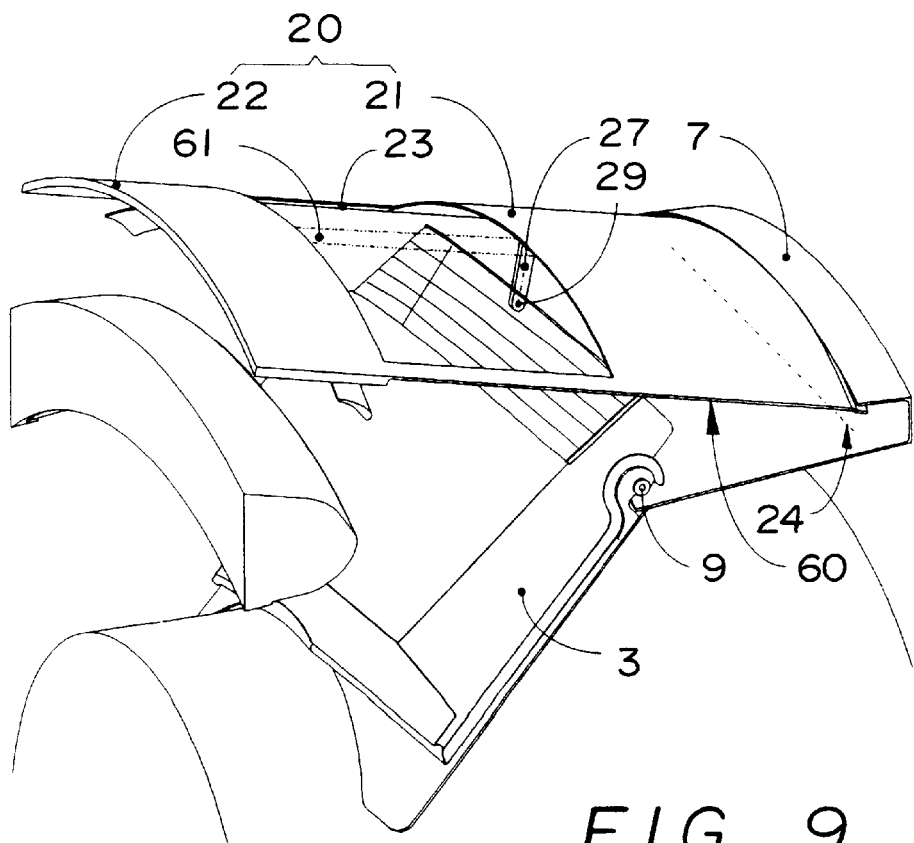

FIGS. 8 and 9 show perspectives of the embodiment of the invention of FIGS. 2 and 3. These figures show one displaceable cowling panel 20 being combined with each door 3. Sidewalls 60 of the displaceable cowling panels may directly interface with one another in the forward-thrust mode or may be juxtaposed with a stationary, intermediary structure. Also, the aperture between the portions 21 and 22 may comprise intermediate or aerodynamic joints, for instance a strip 61 covering the housing cavity of the linear actuator in the door 3.

Figure 10:
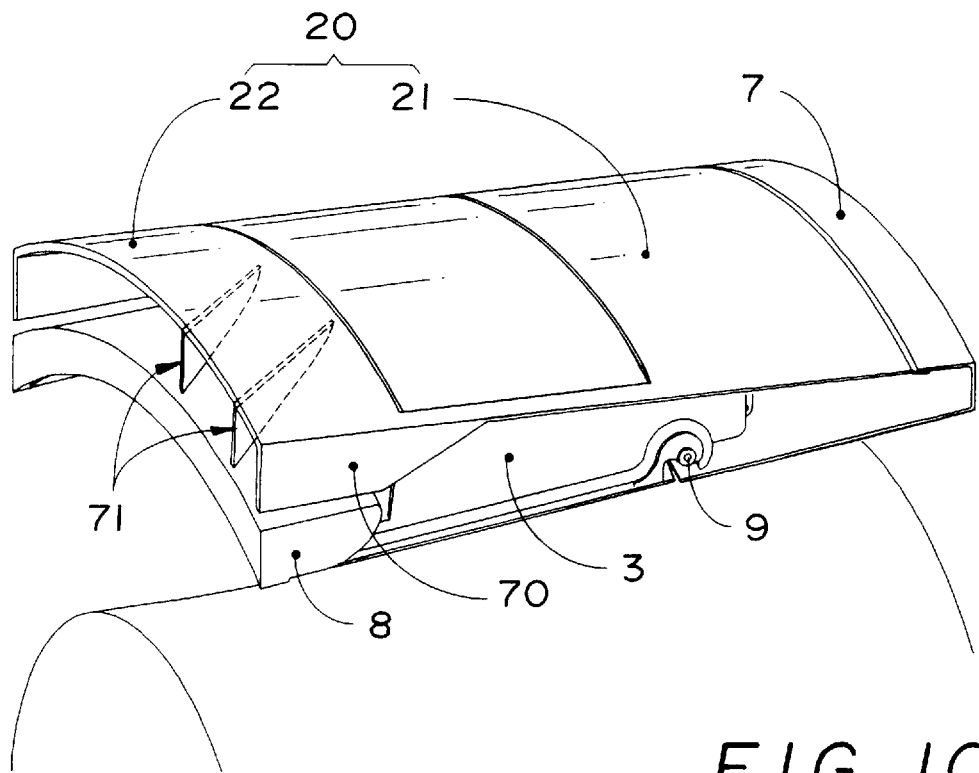
FIG. 10 is a perspective view of another embodiment of the invention.

FIG. 10 illustrates a configuration of the inner structure of the upstream portion 22. Outer guide panels 70 covering apertures in the lateral interface plane of the displaceable cowling panel 20 and/or at least one inner or intermediary guide panel 71, oriented and configured as specified by the expert, form an illustrative implementation for longitudinally controlling the reversed flow.

Figure 11:
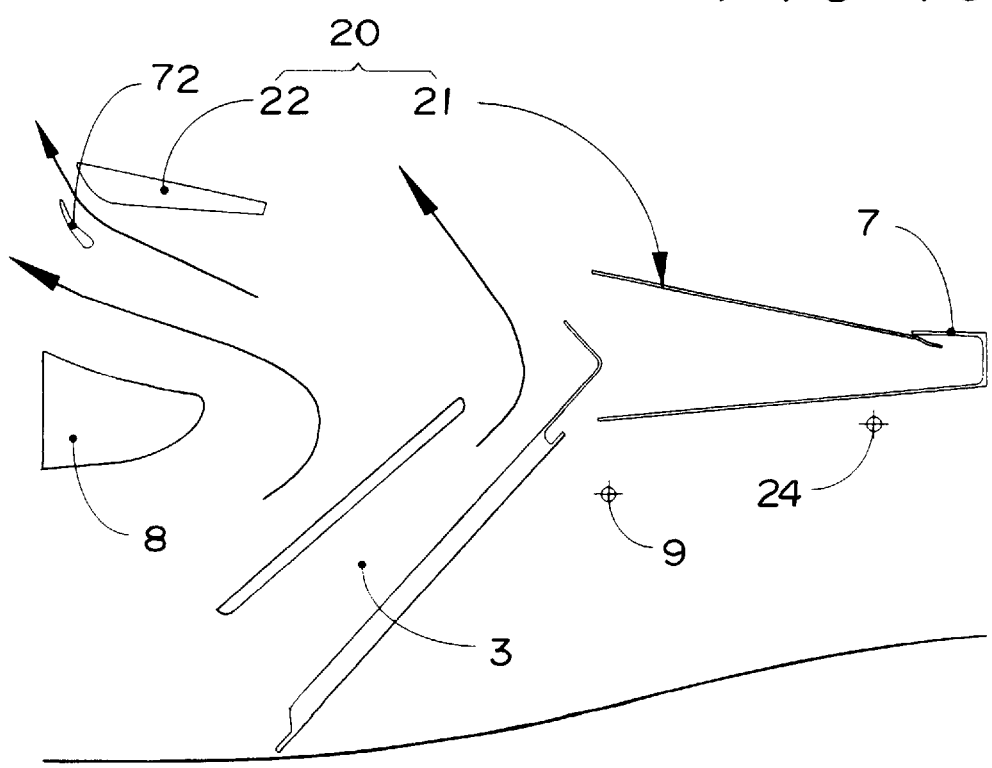
FIG. 11 is a view similar to that of FIG. 2 of another embodiment in the thrust-reversal mode.

Similarly FIG. 11 shows an illustrative configuration of a vane 72 upstream of the inner side of the upstream portion 22 and outside the fore frame 8 for directing the flow away from the external cowling and thereby avoiding any danger of the reversed flow being fed back into the engine.

The two flow-orienting modes, of course, may be combined in a single thrust reverser assembly.

I claim:

1. A bypass turbojet-engine thrust reverser for a turbojet engine including a flow conduit having a longitudinal axis, a stationary structure having an upstream portion (6) with a fore frame (8), a downstream portion (7) and at least one stationary longitudinal beam connecting the upstream and downstream portions (6, 7), and an external cowling, the thrust reverser comprising:

at least one displaceable hollow door (3) which is pivotable about a door pivot (9) by a displacement control system between a closed position in a forward-thrust mode and an open position in a thrust-reversal mode, the door (3) including an outer structure (4) which constitutes part of the external cowling when the door is in the closed position, an inner conduit (10) and an upstream edge, wherein when the door (3) is in the open position the door (3) opens a passage in the external cowling, the upstream edge extends into the flow conduit to constitute at least one flow deflecting baffle, and the conduit acts as a scoop for at least part of the deflected flow; and a displaceable external cowling panel (20) including a downstream portion (21), an upstream portion (22) and two sides (23) linking the upstream and downstream portions (21, 22) so as to form a central aperture in the cowling panel (20) corresponding to the passage, the cowling panel (20) being pivotable on a panel pivot (24) situated downstream of the door pivot (9) between a first position in the forward-thrust mode, in which the cowling panel (20) covers the fore frame (8) and a flow exhaust cross-section of the inner conduit (10) of the door (3) with the outer structure (4) of the door (3) situated within the central aperture to close the passage, and a second position in the thrust-reversal mode, in which an upstream edge of the cowling panel (20) is moved radially outward relative to the longitudinal axis of the flow conduit such that space is cleared above both the fore frame (8) and the exhaust cross-section of the inner conduit (10) for the deflected flow.

2. A bypass turbojet-engine thrust reverser according to claim 1, comprising:

a plurality of the doors (3); and
a plurality of the cowling panels (20);
wherein one cowling panel (20) is associated with each of the doors (3).

3. A bypass turbojet-engine thrust reverser according to claim 1, further comprising:

at least one linkrod (27; 40, 42, 45) connecting the door (3) and the cowling panel (20) such that the door (3) and the cowling panel (20) are simultaneously displaced.

4. A bypass turbojet-engine thrust reverser according to claim 1, further comprising:

at least one linear actuator (50) hinging on the stationary structure, the linear actuator (50) being connected to the cowling panel (20) to drive the displacement thereof.

5. A bypass turbojet-engine thrust reverser according to claim 1, further comprising:

at least one aerodynamic vane (26; 72) disposed between the fore frame (8) of the stationary structure and an inner surface of the upstream portion (22) of the cowling panel (20).

6. A bypass turbojet-engine thrust reverser according to claim 1, further comprising:

at least one row of vanes (53) affixed on a downstream side of the fore frame (8) of the stationary structure.

7. A bypass turbojet-engine thrust reverser according to claim 1, wherein an upstream part (55) of the downstream portion (21) of the cowling panel (20) covers a downstream part (4a) of the outer structure (4) of the door (3) when in the forward-thrust mode and is shaped so as to control the exhaust cross-section of the inner conduit (10) when in the thrust-reversal mode.

8. A bypass turbojet-engine thrust reverser according to claim 1, further comprising:

outer guide panels (70) and at least one intermediary guide panel (71) disposed on an inner side of the upstream portion (22) of the cowling panel (20) which are arranged to longitudinally steer reversed flow.

* * * * *